United States Patent Office 3,314,779
Patented Apr. 18, 1967

3,314,779
STABILIZATION OF AMMONIUM CARBAMATE FOR FERTILIZER USE
Archie V. Slack, Sheffield, Ala., assignor to Tennessee Valley Authority, a corporation of the United States
No Drawing. Filed May 5, 1964, Ser. No. 365,214
6 Claims. (Cl. 71—30)

The invention herein described may be manufactured and used by or for the Government for governmental purposes without payment to me of any royalty thereon.

My invention relates to new and useful improvements in processes for the preparation of ammonium carbamate, and more particularly to a process for the preparation of ammonia carbamate by the reaction of anhydrous ammonia with carbon dioxide, and still more particularly to the production of ammonium carbamate by said reaction of anhydrous ammonia with carbon dioxide with subsequent treatment of the ammonium carbamate, a normally volatile solid, to effect its utility as a fertilizer material.

Ammonium carbamate having a nitrogen content of nearly 36 percent is easily prepared by the reaction of anhydrous ammonia with byproduct carbon dioxide. The reaction is rapid and complete and, since no water is involved, no drying of the solid product is required. In comparison with other nitrogen fertilizer processes, no nitric acid plant is required in the preparation of ammonium carbamate as is required in the preparation of ammonium nitrate, and in addition, no expensive ammonia recycling facilities are needed in the preparation of ammonium carbamate, as is required in the production of urea.

Heretofore, however, it has not been the practice in the chemical industry to produce ammonium carbamate for use as a fertilizer material since, unfortunately, although ammonium carbamate has a high nitrogen content, it also has a vapor pressure at ambient temperatures which causes rapid decomposition, a characteristic which obviously has prevented its use and application as a fertilizer material.

My invention is directed to a method of producing ammonium carbamate by the reaction between anhydrous ammonia and carbon dioxide, followed by pressure treatment of the so-formed ammonium carbamate to substantially decrease internal pore spaces in the product granules, followed by conditioning the surface of the product granules and the subsequent storage of same in containers, the walls of which are substantially impervious to ammonia vapors.

I have overcome the difficulties inherent in the processes of the type of the prior art to a substantial extent in the present invention by a process in one form thereof wherein ammonium carbamate is precipitated by the rapid exothermic reaction of anhydrous ammonia and carbon dioxide; subsequently pelletizing the light crystalline material in roll compacting or other satisfactory agglomeration means; subsequently spray coating sized granules with an inexpensive petroleum oil of medium viscosity; and bagging the product for storage or shipment in medium weight polyethylene or the like plastic bags. In another form of my process for the production and preparation of ammonium carbamate, the pelletized carbamate is first impregnated with oil (2 to 3 percent by weight) and then coated with a material such as petroleum oil or materials selected from the group comprising paraffin, cetyl alcohol, linseed oil, and white paraffin oil prior to its bagging. Furthermore, several new and advantageous features are realized in the present invention for the production and subsequent preparation of ammonium carbamate pellets to be used as a fertilizer material.

Among these advantageous features are: the preparation of a fertilizer material of relatively high nitrogen content (36 percent N), which may be directly and easily prepared from relatively inexpensive raw materials in a relatively short time and in which process no water is involved, thereby eliminating the necessity of any drying operation prior to bagging the fertilizer material. In addition, in my process for the production of a nitrogen fertilizer material, there are no requirements for an expensive nitric acid plant and also no requirements for providing expensive ammonia recycling facilities.

It is therefore an object of the present invention to provide a process for the economical and direct production of ammonium carbamate in a state of high purity and so conditioned that its otherwise inherent characteristic of high volatility is substantially and economically altered, thereby effecting the utility of such ammonium carbamate as a fertilizer material.

Another object of the present invention is to provide a process for the economical and direct production of ammonium carbamate in such form as to make it technically and economically feasible to utilize same as a fertilizer material by means of reducing decomposition losses during its manufacture, storage, and field distribution.

Still further and more general objects and advantages of the present invention will appear from the more detailed description set forth below, it being understood, however, that this more detailed description is given by way of illustration and explanation only, and not by way of limitation, since various changes therein may be made by those skilled in the art without departing from the spirit and scope of the present invention.

My invention, together with further objects and advantages thereof, will be better understood from a consideration of the following description:

The reaction of ammonia and carbon dioxide is a rapid, exothermic reaction which goes to completion in stoichiometric proportions. The reaction can be carried out in (1) a saturated solution of liquid ammonia, (2) a non-solvent fluid such as petroleum ether or petroleum oil, or (3) a gas-phase system in a dry-film type reactor having a mechanical scraper. A large cooling capacity is required to remove the heat of reaction (about 3600 B.t.u./lb.) in order to keep the product at 100° F. or less. Evaporation of excess ammonia, cooling with water coils, or external refrigeration with ammonia may be used.

In recovery of the solid carbamate, continuous or batch centrifuges or hooded or pressurized continuous rotary filters may be used to filter the solid from the reaction suspension. A dry solid is produced directly in the dry-film reactor.

Following recovery of the precipitated carbamate is the compaction, or pelletizing, step. Any of the commercial pelletizing methods might serve, but pressure compaction appears to be the most suitable. It has been found that compaction at relatively high pressure of up to 50,000 p.s.i.g.—such as is encountered in roll compaction or tabletting—significantly decreases the rate of decomposition and is a desirable adjunct to the coating treatment. Roll-compaction equipment offers the most economical method of pelletizing, but tabletting is equally effective. Non-pressure compaction (granulation) might be acceptable but would not be as effective as pressure compaction.

After pelletizing is accomplished, the pellets are screened to the desired particle size range. Tests have shown that the rates of decomposition are significantly lower for larger particles (+10 mesh) than for smaller (−10 mesh). It would therefore be desirable to produce and screen for product the largest particles possible, consistent with optimum pelletization and recycling costs and with customer acceptability.

The final treatment of the screened carbamate is the coating step. Any medium viscosity oil (about 215 Saybolt seconds at 130° F.; equivalent to SAE-30) was found to be effective in reducing decomposition of the carbamate to 2 to 3 percent in five hours when about 4 to 5 percent of oil was sprayed on the pellets. A mixture of No. 6 fuel oil (77 percent) and No. 1 diesel oil (23 percent) was quite effective and was a relatively low cost combination. A cost of about $0.80 per ton of coated product was estimated for this mixed oil. The oil may be applied easily by spraying onto a rolling bed of pellets in a rotary drum; pressure spray nozzles or air-atomizing sprays may be used. Any other type of uniform application would be effective.

While petroleum oil coatings have been found to be the least expensive and easiest coatings to apply to carbamate, other types of coating have been found to be equally effective in reducing the rate of decomposition. Pellets first impregnated with oil (2-3 percent by weight) and then coated with paraffin or cetyl alcohol were quite stable. Linseed oil and white paraffin oil coatings were also satisfactory. Synthetic plastic coatings would be effective although expensive.

The coated product is then bagged in heat-sealable polyethylene or other commercially available synthetic plastic fertilizer bags. A number of such plastics were tested; most are equal or superior to polyethylene but are generally more expensive or are not yet available as fertilizer bags.

All of the equipment used in the steps above should be hooded for minimum processing losses. The ammonia recovered from these units might be used by recycling to the precipitation step or to a downstream plant making some other material.

The combination of the above steps makes it possible to use ammonium carbamate as a fertilizer material. Use of the plastic bags reduces loss during storage to a negligible amount. The combination of pressure pelletizing and oil coating reduces losses during open exposure to a tolerable amount. In determining loss during open exposure, a test period of five hours was used. This should be adequate for a period between opening the bag on the farm and applying the material to the soil. It would be necessary to place the material beneath rather than on the surface of the soil. Light coverage, on the order of two inches, should be adequate. As in the case of aqua ammonia, volatilization loss is prevented by sorption of ammonia on soil particles.

It is necessary to use the particular combination of steps, which have been described, to make the use of carbamate as a fertilizer feasible. Use of plastic bags to contain fertilizers is well known; however, this alone would not be adequate for carbamate since loss after opening of the bag would be too great. Use of oily or waxy coatings is also known; however, this alone would not be adequate since loss during storage in pervious bags would be too large. The coated carbamate does decompose to a slight extent during bag storage. However, as soon as the atmosphere in the bag becomes saturated with ammonia, and pressure is equalized between the interior and exterior of the bag, little further loss takes place. The coating has no function during storage in the plastic bag; unconditioned carbamate would store as well. The function of the coating and the high particle density comes into effect only during bagging or when the bag is opened. It is probably possible to put on a coating that would permit the use of porous bags or the open storage of carbamate. However, such a coating would be too thick or too expensive to be practical. The only feasible approach is to control long-term storage loss by a suitable container and the short-term loss from exposed material by coating and increasing the particle density as described.

Control of the variables to give a particular combination is necessary for best results. As has been mentioned, the pellets should be large, preferably larger than 10 mesh. Best results were obtained at a particular pelletizing pressure, about 40,000 p.s.i.g. Unexpectedly, higher pressures gave a less stable product. A particular viscosity range of oil, about 200 to 215 Saybolt seconds at 130° F., was best; the reason for this is not readily evident. A combination of oil impregnation and a solid coating gave particularly good results. Presumably, the internal oil coating on the crystals making up the pellet slowed movement of ammonia to the surface, thus making the surface barrier more effective.

In order that those skilled in the art may better understand how the present invention can be practiced and more fully and definitely understood the following examples of processes which we have used in the direct production of ammonium carbamate from the precipitation of same by the reaction of anhydrous ammonia with carbon dioxide followed by compaction into pellets, which pellets in turn are subsequently coated, with or without prior impregnation thereof, and sent to storage in bags whose walls are impervious to ammonium vapor are given by way of illustration and not by way of limitation.

*Example I*

Pellets of dry ammonium carbamate were made by compaction over the range of 20,000 to 100,000 p.s.i.g. (calculated from compactor area and load). Storage of the pellets for 5 hours under humid conditions (79 percent relative humidity) at atmospheric pressure (standard decomposition test) indicated that a minimum decomposition loss of 15 percent by weight occurred with the pellets made at 40,000 p.s.i.g. pressure. Higher or lower pressures resulted in greater losses. Uncompacted material lost about 24 percent of its weight under the same conditions.

*Example II*

Pellets produced by compacting dry ammonium carbamate at 40,000 p.s.i.g. were coated with SAE-30 motor oil by spraying the oil onto a moving bed of pellets. The coated pellets, containing 2 to 16 percent oil, lost 9 to 1 percent of their weight, respectively, in the standard decomposition test (Example 1). Three percent of the substrate was lost from the pellets having a 4.5 percent oil coating, as compared to 15 percent from uncoated pellets (Example 1).

*Example III*

Pellets produced at 50,000 p.s.i.g. were coated with four petroleum oils of different viscosities, i.e., SAE-10, -20, -30, and -40. The coatings were 5.5 percent by weight in each case. The pellets coated with the medium viscosity oil SAE-30 (215 Saybolt seconds at 130° F.) lost about 3 percent by weight; those coated with SAE-10 (105 Saybolt seconds at 130° F.), SAE-20 (152 Saybolt seconds at 130° F.), and SAE-40 (270 Saybolt seconds at 130° F.) lost 5 to 6 weight percent in the standard exposure test.

*Example IV*

Pellets produced at 40,000 p.s.i.g. were coated with a mixture of No. 6 fuel oil (77.5 percent by weight) and No. 1 diesel oil (22.5 percent by weight) such that the coating amounted to 3.5 percent by weight. The viscosity of this mixture was about 200 Saybolt seconds at 130° F. (slightly lower than that of SAE-30). Under the standard exposure test conditions, the pellets lost only 3 percent of their weight.

*Example V*

Pellets produced at 40,000 p.s.i.g. pressure from oil (SAE-20) soaked carbamate in such a way as to leave the pellets impregnated with the oil (about 2 percent by weight) were further spray coated with molten paraffin (3.5 percent) or molten cetyl alcohol (8 percent—a hydrophobic compound). The paraffin-coated pellets lost only one percent and the alcohol-coated pellets lost only 0.5 percent in the standard exposure test.

*Example VI*

Pellets produced in the usual manner were coated with a 6 percent coating of cottonseed oil; the pellets lost 1.0 percent by weight in the standard exposure test.

*Example VII*

Samples of commercially produced plastic fertilizer bags were tested for gas losses from pelletized ammonium carbamate sealed in the test chamber. Losses through 10 mil thick polyethylene specimens varied from 0.2 percent at 78° F. to 2.5 percent at 100° F. in 3 months. A fluorhalocarbon film 10 mils thick permitted losses of only 0.3 percent at 100° F. in the same time. Full scale bag (50 lb.) storage tests with 10 mil polyethylene bags for 33 weeks indicated that the losses were negligible at 78° F. and about 1.0 percent at 110° F.

While I have shown and described particular embodiments in my invention, modifications and variations thereof will occur to those skilled in the art. I wish it to be understood therefore that the appended claims are intended to cover such modifications and variations that are within the true scope and spirit of my invention.

What I claim as new and desire to secure by Letters Patent of the United States is:

1. A process for the production of a nitrogen-containing fertilizer material which comprises the steps of reacting anhydrous ammonia with carbon dioxide; collecting the resulting light crystalline ammonium carbamate material; compacting and pelletizing said resulting ammonium carbamate material; classifying by size said pelletized material and separating out therefrom those pellets desired of a predetermined size; spray coating said sized ammonium carbamate pellets with a petroleum based oil of medium viscosity; and storing said spray-coated ammonium carbamate pellets in containers, the walls of which are substantially impervious to ammonia vapor.

2. The process of claim 1 wherein the pelletizing pressure to which the light crystalline ammonium carbamate material is subjected is on the order of approximately 40,000 pounds per square inch.

3. The process of claim 2 wherein the viscosity of the petroleum based oil used therein is in the range of about 200 to 215 Saybolt seconds at 130° F.

4. The process of claim 3 wherein the material selected from said classifying step as onsize is in the mesh range from about 10 mesh up to about 6 mesh.

5. The process of claim 3 wherein the compacted pellets of ammonium carbamate are impregnated with from about 2 to about 3 percent by weight of a petroleum based oil prior to the spray coating of the sized pellets.

6. The process of claim 5 wherein the hydrophobic medium used to spray the liquid petroleum based oil impregnated ammonium carbamate pellets is selected from the group consisting of molten paraffin, molten cetyl alcohol, cottonseed oil, and mixtures thereof.

References Cited by the Examiner
UNITED STATES PATENTS
3,048,478   8/1962   Smith _____ 71—64 X
3,223,518   12/1965  Hansen _____ 71—64

OTHER REFERENCES

Karrer, P.: Orangic Chemistry, New York, Elsevier Publishing Co., Inc., 1946, page 217.

DONALL H. SYLVESTER, *Primary Examiner.*

R. BAJEFSKY, *Assistant Examiner.*